| United States Patent [19] | [11] Patent Number: 5,001,181 |
| Takagi et al. | [45] Date of Patent: Mar. 19, 1991 |

[54] RESIN COMPOSITION

[75] Inventors: Kiyoji Takagi; Koji Nishida, both of Yokkaichi, Japan

[73] Assignee: Mitsubishi Petrochemical Company, Ltd., Tokyo, Japan

[21] Appl. No.: 399,007

[22] Filed: Aug. 28, 1989

[30] Foreign Application Priority Data

Aug. 31, 1988 [JP] Japan .................................. 63-215157

[51] Int. Cl.$^5$ .......................... C08K 3/30; C08L 71/12; C08L 77/00
[52] U.S. Cl. ..................................... 524/401; 524/280; 524/418; 524/423; 524/424; 524/430; 524/431; 524/432; 524/436; 524/442; 524/492; 524/497; 524/508; 525/397; 525/905
[58] Field of Search ............... 524/280, 401, 418, 423, 524/424, 430, 431, 432, 436, 442, 492, 497, 508; 525/397, 905

[56] References Cited

U.S. PATENT DOCUMENTS

| 4,315,086 | 2/1982 | Ueno et al. ........................ 525/397 |
| 4,600,741 | 7/1986 | Aycock et al. ..................... 525/397 |
| 4,771,086 | 9/1988 | Martin ............................... 524/497 |

*Primary Examiner*—Jacob Ziegler
*Attorney, Agent, or Firm*—Oblon, Spivak, McClelland, Maier & Neustadt

[57] ABSTRACT

There is discloses a resin composition which comprises a polyphenylene ether resin, a polyamide resin, an alkenylaromatic compound-conjugated diene copolymer; a compound having unsaturated group and polar group in combination within the same molecule; and an inorganic filler, and the polyphenylene ether resin being dispersed into the polyamide resin which forms continuous phase, and the inorganic filler being dispersed into dispersed phases of the polyphenylene ether resin.

11 Claims, 1 Drawing Sheet

F I G. 1
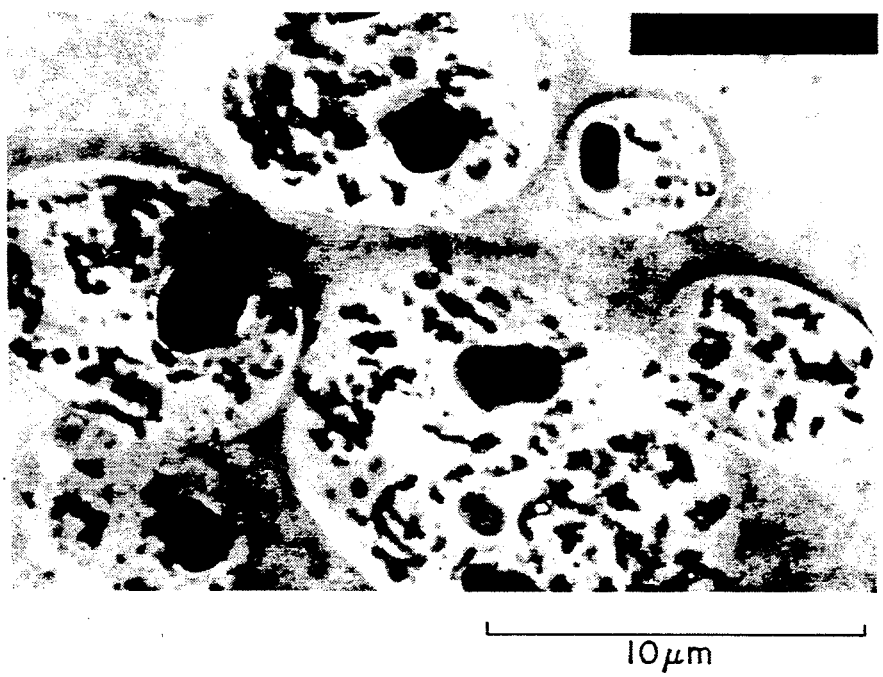
10μm

RESIN COMPOSITION

BACKGROUND OF THE INVENTION

This invention relates to a resin composition, more particularly to a resin composition having excellent balance in physical properties of rigidity and impact strength, and also having good organic solvent resistance and moldability.

Polyphenylene ether resin is attracting attention as useful resin having excellent mechanical properties and heat resistance, and, for example, has been used as a blend with a styrenic resin, but it is remarkably poor in solvent resistance, and for improving this point, there have been proposed blends with polyamide (Japanese Patent Publication No 41663/1984, etc.), polyester (Japanese Patent Publication No. 21662/1976).

Further, for the purpose of improving impact strength of these blends, a composition comprising a compound containing such group as carboxylic acid, imide, epoxy, etc. and a rubbery material to a combination of polyphenylene ether and polyamide (Japanese Provisional Patent Publication No. 49753/1984), etc. have been proposed.

On the other hand, in recent years, with expansion of uses of plastics, as well as due to trend for enlargement and thinning of thickness, improvement in balance in physical properties of rigidity and impact strength is becoming to be demanded.

As an approach to enhance rigidity, there has been, for example, practiced the method of introducing an inorganic filler, but in this case, the molded product is liable to become brittle to lower the impact strength level, and its uses is generally remarkably restricted. Thus, it is very difficult to satisfy the balance in physical properties of high rigidity and impact strength.

SUMMARY OF THE INVENTION

Accordingly, an object of the present invention is to provide a resin composition having excellent balance in physical properties of rigidity and impact strength, and also having excellent solvent resistance and moldability.

The present inventors have investigated intensively in order to accomplish the above object and consequently found that by formulating an alkenyl aromatic compound-conjugated diene, a compound having unsaturated group and polar group in the same molecule and an inorganic filler into a combination of a polyphenylene ether resin and a polyamide resin blended, a composition having more excellent balance in physical properties of rigidity and impact strength can be obtained as compared with the case when other inorganic fillers are employed, to accomplish the present invention.

More specifically, the resin composition of the present invention is a resin composition comprising: (A) 100 parts by weight of a resin comprising:

(1) 20 to 60 % by weight of a polyphenylene ether resin,
(2) 25 to 65 % by weight of a polyamide resin and
(3) 1 to 35 % by weight of an alkenylaromatic compound-conjugated diene copolymer;
(B) 0.01 to 10 parts by weight of a compound having unsaturated group and polar group in combination within the same molecule; and
(C) 1 to 50 parts by weight of an inorganic filler having an average particle size of 1 μm or less, said polyphenylene ether resin being dispersed into the polyamide resin which forms the continuous phase, and said inorganic filler being dispersed into the dispersed phases of the polyphenylene ether resin.

BRIEF DESCRIPTION OF THE DRAWING

FIG. 1 is an enlarged photographo (×5000) by a transmissive type electron microscope of a composition of the present invention obtained in Example 1.

DESCRIPTION OF THE PREFERRED EMBODIMENTS

First, the component (A) is to be described. The component (A) comprises the three components (1), (2) and (3) as mentioned above.

The component (1) contained in (A) is a polyphenylene ether resin, which has a recurring structural unit represented by the following formula:

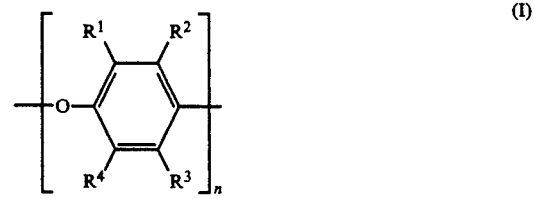

wherein the ether oxygen atom of one unit is connected to the benzene nucleus of the adjacent unit, n is at least 50, $R^2$, $R^2$, $R^3$ and $R^4$ each independently represent a monovalent group selected from the group consisting of hydrogen atom, halogen atoms, hydrocarbon groups containing no tertiary α-carbon atom, halohydrocarbon groups having at least 2 carbon atoms between halogen atom and benzene nucleus, hydrocarbonoxy gropus, and halohydrocarbonoxy groups having at least 2 carbon atoms between halogen atom and benzene nucleus.

In the above formula (I), examples of the hydrocarbon groups containing no tertiary o-carbon atom represented by $R^1$, $R^2$, $R^3$ and $R^4$ may include lower alkyl groups such as methyl, ethyl, propyl, isopropyl and butyl; alkenyl groups such as vinyl, allyl, butenyl and cyclobutenyl; aryl group such as phenyl, tolyl, xylenyl and 2,4,6-trimethylphenyl; aralkyl groups such as benzyl, phenylethyl and phenyl propyl. Examples of halohydrocarbon groups having at least 2 carbon atoms between halogen atom and benzene nucleus may include 2-chloroethyl, 2-bromoethyl, 2-fluoro-ethyl, 2,2-dichloroethyl, 2- and 3-bromopropyl, 2,2-difluoro-3-iodopropyl, 2-,3-,4- and 5-fluoroamyl,2-chlorovinyl, chloroethylphenyl, ethylchlorophenyl, fluoro-xylyl, chloronaphthyl, bromobenzyl groups, etc.

As the hydrocarbonoxy groups, there may be included, for example, methoxy, ethoxy, propoxy, butoxy, phenoxy, ethylphenoxy, naphthoxy, methylnaphthoxy, benzoxy, phenylethoxy, triethoxy groups, etc. Examples of halohydrocarbonoxy groups having at least 2 carbon atoms between halogen atom and benzene nucleus may include 2-chloroethoxy, 2-bromoethoxy, 2-fluoroethoxy, 2,2-dibromoethoxy, 2- and 3-bromopropoxy, chloroethylphenoxy, ethylchlorophenoxy, iodoxyloxy, chloronaphthoxy, bromobenzoxy, chlorotolylethoxy groups, etc.

As the polymer having the constituent unit of the above formula (I), there may be also included copolymers such as copolymer of 2,6-dimethylphenol with 2,3,6-trimethylphenol, copolymer of 2,6-dimethylphenol with 2,3,5,6-tetramethylphenol, copolymer of 2,6-diethylphenol with 2,3,6-trimethylphenol and the like.

Further, the polyphenylene ether to be used in the present invention also includes modified polyphenylene ethers such as the polyphenylene ether defined by the above formula (I) having a styrenic monomer (e.g. styrene, p-methylstyrene, α-methylstyrene, etc.) grafted thereon, etc.

The methods for preparing the polyphenylene ethers corresponding to the above have been known in the art, and disclosed in, for example, U.S. Pat. Nos. 3,306,874, 3,306,875, 3,257,357 and U.S. Pat. No. 3,257,358, and Japanese Patent Publication No. 17880/1977 and Japanese Provisional Patent Publication No. 51197/1975.

A group of polyphenylene ethers preferable for the object of the present invention are those having alkyl substituents at the 2 ortho-positions relative to the ether oxygen atom and copolymers of 2,6-dialkylphenol with 2,3,6trialkylphenol.

The polyphenylene ether resin to be used in the present invention should preferably have an inherent viscosity of 0.35 to 0.70 dl/g (measured at 30° C. in chloroform).

Next, the component (2) contained in (A) is to be described. The polyamide resin to be used in the present invention has

bond in the polymer main chain, and can be melted by heating. Representative examples may include nylon-4, nylon-6, nylon-6,6, nylon-4,6, nylon-12, nylon-6,10 and the like, and ohherwise known low crystalline or amorphous polyamides containing monomeric components such as aromatic diamine, aromatic dicarboxylic acid, etc. or transparent nylons, etc. may be also used.

The polyamide resin which may be particularly preferably used in the present invention is nylon-6,6 and nylon-6, and commercially available products of these can be used. Specifically, there may included those sold under the trade name of Ultramid, etc. from BASF, West Germany.

The polyamide resin to be used in the present invention should preferably have a relative viscosity of 2.0 to 8.0 (measured at 25° C., in 98 % sulfuric acid).

Next, the alkenyl aromatic compound-conjugated diene copolymer of the component (3) contained in (A) is to be described.

As the alkenylaromatic compound to be used, there may be specifically included styrene; chlorostyrene, lower alkylsubstituted styrene such as α-methylstyrene, vinyltoluene, etc.; vinylnaphthalene, etc., preferably styrene.

As the conjugated diene, there may be included aliphatic straight chain dienes such as butadiene, isoprene, etc.; lower alkyl-substituted aliphatic straight chain dienes such as 2,3-dimethylbutadiene, etc.; cyclopentadiene and derivatives thereof; etc, preferably butadiene. Also, two or more kinds of these conjugated dienes may be used.

The compound (3) in the present invention is a copolymer forming a bonding fashion of random, graft, block, etc. comprising the alkenyl aromatic compound and the conjugated diene as described as primary monomeric components, and may also include partially a crosslinked structure. Among them, preferred are random copolymers and block copolymers, more preferably block copolymers, particularly linear block copolymers represented by the following formula:

(wherein A represents a polymer block of the alkenyl aromatic compound as described above, B represents an elastomeric block of the conjugated diene, m represents 0 or a positive integer and n represents 0 or 1).

The block A in the copolymer linear block copolymer represented by the above formula (II) may have generally a weight average molecular weight of 500 to 125,000, preferably 5,000 to 110,000, and the polymer block B generally a weight average molecular weight of 1,500 to 250,000, preferably 15,000 to 220,000, but polymer blocks A and B with further smaller molecular weights may be also contained.

As a measure showing the molecular weight of a block copolymer, there is solution viscosity, and for accomplishing the object of the present invention, the copolymer of the component (3) should preferably have a Brookfield viscosity value in 25 % by weight of toluene solution at 25° C. within the range of 200 to 40,000 cps, more preferably 600 to 30,000 cps, particularly 800 to 25,000 cps.

The copolymer of the component (3) may be also one having at least a part of the double bonds derived from the conjugated diene hydrogenated, and may also contain in addition to the above diene component olefinic hydrocarbons such as ethylene, propylene, 1-butene, etc. or nonconjugated dienes within the range which does not impair greatly the elastomeric properties of the polymer block A.

The ratio of the alkenylaromatic compound units in the component (3) may be preferably within the range of 20 to 70 % by weight, more preferably 25 to 60 % by weight, particularly 28 to 50 % by weight, most preferably 30 to 45 % by weight.

The alkenylaromatic compound-conjugated diene copolymer of the component (3) can be produced as described below.

For example, in the case of the above block copolymer, a large number of methods have been proposed, and a representative method is the method as disclosed in Japanese Patent Publication No. 23798/1965, U.S. Pat. Nos. 3,595,942 and 4,090,996, in which block copolymerization is carried out in an inert solvent by use of a lithium catalyst or a Ziegler type catalyst. As one of such block copolymers, there is one commercially sold under trade name of "KRATON G" or "Kaliflex" from Shell Chemical Co. or "TR" from Nippon Synthetic Rubber K.K.

Hydrogenation treatment of these block copolymers are conducted by hydrogenating the copolymers in the presence of a hydrogenation catalyst in an inert solvent according to the processes as described in Japanese Patent Publication No. 8704/1967, No. 6636/1968 or No. 20814/1971. In this hydrogenation, at least 50 %, preferably 80 % or more of olefinic double bonds in the polymer block B are hydrogenated and 25 % or less of the aromatic unsaturated bonds in the polymer block A are hydrogenated.

It is also possible to carry out hydrogenation by use of p-toluenesulfonyl hydrazide in an inert solvent according to the process as shown in literatures of Journal of Polymer Science, Part B, Polymer Letters, volume 11, pp. 427-434 (1973), etc.

As one of such hydrogenated block copolymers, there is one commercially available under the trade name of "KRATON-G" by Shell Chemical Co.

Also, a plurality of copolymers selected from among the copolymers obtained by these hydrogenations may be used in combination.

In the resin composition of the present invention, the component (A) comprises the components (1), (2) and (3) as described above, and the formulation ratios may be 20 to 60% by weight, preferably 23 to 55 % by weight, more preferably 25 to 52 % by weight of the ratio of the component (1) in (A), 25 to 65 % by weight, preferably 30 to 60 % by weight, more preferably 35 to 58 % by weight of the ratio of (2), 1 to 35 % by weight, preferably 1 to 25 % by weight, more preferably 2 to 20 % by weight, particularly 2 to 15 % by weight of the ratio of (3).

If (1) is less than 20 % by weight, heat resistant rigidity is unsatisfactory, while if it exceeds 60 % by weight, organic solvent resistance is deficient. If (2) is less than 25 % by weight, organic solvent resistance is unsatisfactory, while if it exceeds 65 % by weight, heat resistant rigidity becomes unsatisfactory. If (3) is less than 1 % by weight, impact strength level is unsatisfactory, while if it exceeds 35 % by weight, rigidity level becomes unsatisfactory.

Next, the compound having unsaturated group and polar group in combination in the same molecule of the component (B) is to be described.

In the present invention, the compound having unsaturated group and polar group in combination may be a compound having unsaturated group, namely carbon-carbon double bond or carbon-carbon triple bond, and polar group, namely an amide bond contained in a polyamide resin, the carboxyl group existing in the chain terminal end, a functional group exhibiting affinity for or chemical reactivity with amino group in combination in the same molecule. As such functional groups, there may be included carboxyl groups of carboxylic acids, groups derived from carboxylic acids, namely various salts or esters derived by substitution of hydrogen atom of hydroxyl group of carboxyl groups, acid amides, acid anhydrides, imides, acid azides, acid halides, or oxazoline, nitrile, epoxy group, amino group, hydroxyl group, or isocyanic esters, etc. As the compound having unsaturated group and polar group in combination, unsaturated carboxylic acids, unsaturated carboxylic acid derivatives, unsaturated epoxy compounds, unsaturated alcohols, unsaturated amines, unsaturated isocyanic acid esters, etc. may be primarily used.

Specifically, there may be included maleic anhydride, maleic acid, fumaric acid, maleimide, maleic hydrazide, reaction products of maleic anhydride and a diamine, for example, those having the structures represented by the following formulae.

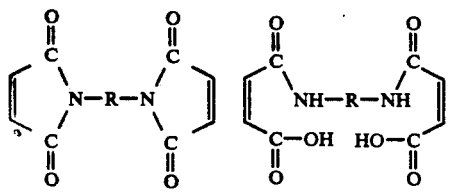

(wherein R represents an aliphatic group or an aromatic group), methylnadic anhydride, dichloromaleic anhydride, maleic amide, itaconic acid, itaconic anhydride, natural oils such as soybean oil, tung oil, castor oil, linseed oil, hempseed oil, cottonseed oil, sesame oil, rapeseed oil, peanut oil, tsubaki (camellia) oil, olive oil, coconut oil, sardine oil, etc., epoxidized natural oils such as epoxidized soybean oil, unsaturated carboxylic acids such as acrylic acid, butenoic acid, crotonic acid, vinylacetic acid, methacrylic acid, pentenoic acid, angelic acid, tiburic acid, 2-pentenoic acid, 3 pentenoic acid, α-ethylacrylic acid, α-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosnoic acid, micolipenoic acid, 2,4-pentadienoic acid, 2,4-hexadienoic acid, diallylacetic acid, geranium acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentenoic acid, erucic acid, docosadienoic acid, docosatrienoic acid, docosatetranoic acid, docosapentaenoic acid, tetracosenoic acid, hexacosenoic acid, hexacodienoic acid, octacosenoic acid, triacontenoic acid, etc. or esters, acid amides, anhydrides of these unsatuaated carboxylic acids, or allyl alcohol, crotyl alcohol, methylvinylcarbinol, allylcarbinol, methylpropenyl-carbinol, 4-penten-1-ol, 10-undecen-1-ol, propargyl alcohol, 1,4-pentadien-3-ol, 1, 4-hexadien-3-ol, 3,5 hexadien-2-ol, 2,4-hexadien-1-ol, alcohols represented by the formulae $C_nH_{2n-5}OH$, $C_nH_{2n-7}OH$, $C_nH_{2n-9}OH$ (where n is a positive integer) unsaturated alcohols such as 3-butene-1,2-diol, 2,5-dimethyl-3-hexene-2,5-diol, 1,5-hexadiene-3,4-diol, 2,6-octadiene,4,5-diol, or unsaturated amines with OH groups of such unsaturated alcohols replaced with $NH_2$ groups, or low polymerization degree (e.g. having a weight average molecular weight of 500 to about 10,000) or high polymerization degree polymers (e.g. having a weight average molecular weight of 10,000 or higher) of butadiene, isoprene, etc. having maleic anhydride, phenols added thereon, or having amino group, carboxyl group, hydroxyl group, epoxy group, etc. introduced thereinto, allyl isocyanate, etc.

In the definition of the compound having unsaturated group and polar group in combination of the component (B), compounds having two or more unsaturated groups and two or more polar groups (the same kind or different kinds) are included as a matter of course, and also two or more kinds of the component (B) can be used. Among them, more preferably, there may be employed unsaturated dicarboxylic acids and anhydrides thereof such as maleic anhydride, maleic acid, itaconic anhydride, itaconic acid, etc., unsaturated alcohols such as oleyl alcohol, etc., epoxidized natural oils such as epoxidized soybean oil, more preferably maleic anhydride, maleic acid, oleyl alcohol, epoxidized soybean oil, epoxidized linseed oil, above all preferably maleic anhydride, a mixture of maleic anhydride and maleic acid.

The component (B) may be formulated in an amount of 0.01 to 10 parts by weight, preferably 0.05 to 5 parts by weight, more preferably 0.1 to 2 parts by weight, particularly 0.15 to 1 part by weight, based on 100 parts by weight of the component (A). If the component (B) is less than 0.01 part by weight, the impact strength is unsatisfactory, while if it exceeds 10 parts by weight, difficulty may occur in appearance of the molded product.

Next, the inorganic filler of the component (C) is to be described.

In the present invention, as described below, the inorganic filler is absorbed selectively into the polyphenylene ether resin dispersed in the polyamide resin to be dispersed in a polyphenylene ether resin dispersed phases.

For having good affinity for the polyphenylene ether resin in order to be selectively dispersed into the polyphenylene ether resin, the average particle size of the inorganic filler is important, and the average particle should be 1 μm or less, preferably 0.8 μm or less, more preferably 0.5 μm or less. Above all, one having an average particle size of 0.01 to 5 μm, further 0.05 to 0.3 μm is preferred for further enhancing the balance in physical properties of rigidity and impact strength.

In the present specification, the average particle size is an average of the maximum diameters of the primary particles measured by observation with an electron microscope.

As the shape of the inorganic filler, various shapes such as particulates of spherical, cubic, etc., needles, plates, fibers, etc. can be used, and among them, particulates are preferred for having the effect of improving dimensional stability as well as excellent balance of mechanical properties.

As the inorganic filler to be dispersed selectively into the polyphenylene ether resin, there may be included single substances, oxides, hydroxides, carbonates, sulfates, silicates, sulfites of metal atoms from the group I to the group VIII of the periodic table such as Fe, Na, K, Cu, Mg, Ca, Zn, Ba, Al, Ti, etc. or silicon, and various clay minerals in which at least one of these compounds exist.

Specific examples may include titanium oxide, zinc oxide, barium sulfate, silica, calcium carbonate, iron oxide, alumina, calcium titanate, aluminum hydroxide, magnesium hydroxide, calcium hydroxide, magnesium carbonate, calcium sulfate, sodium sulfate, calcium sulfite, calcium silicate, clay, wallastonite, etc. Among them, because they are particulate, titanium oxide, zinc oxide, barium sulfate, precipitated calcium carbonate, clay and silica having an average particle size ranging from 0.01 to 1.0 μm is preferred.

The above inorganic fillers as described above may be also used in combination of plural kinds.

The inorganic filler may be used as untreated, but for the purpose of enhancing affinity for the resin or the interfacial bonding force, there can be also used inorganic surface treating agents such as $Al_2O_3$, $SiO_2$, ZnO, $ZrO_2$, etc.; higher fatty acids or esters, salts thereof, for example, stearic acid, oleic acid, palmitic acid, calcium stearate, magnesium stearate, aluminum stearate, stearic amide, ethyl stearate, methyl stearate, calcium oleate, oleic amide, ethyl oleate, calcium palmitate, palmitic amide, ethyl palmitate, etc.; coupling agents such as vinyltrimethoxysilane, vinyltriethoxysilane, vinyltriacetoxysilane, γ-chloropropyltrimethoxysilane, γ-aminopropyltrimethoxysilane, γ-methacryloxypropyltrimethoxy-silane, β-(3,4-epoxycyclohexyl)ethyltrimethoxysilane, γ-glycidoxypropyltrimethoxysilane, etc; titanium coupling agents such as isopropyltriisostearoyl titanate, isopropyltrilaurylmyristyl titanate, isopropylisostearoyldimethacryl titanate, isopropyltridiisooctylphosphate titanate, etc.; together with the inorganic filler.

The component (C) may be formulated in an amount of 1 to parts by weight, preferably 1 to 35 parts by weight, more preferably 2 to 20 parts by weight based on 100 parts by weight of the component (A). If the component (C) is less than 1 part by weight, the balance of physical properties of rigidity and impact strength is unsatisfactory, while if it exceeds 50 parts by weight, impact strength becomes unsatisfactory, and also moldability becomes somewhat unsatisfactory.

The resin composition of the present invention comprises the components (A), (B) and (C) blended at a specific ratio, and in addition to the above essential components, there can be added optional components such as thermoplastic or thermosetting resins, rubber components, various stabilizers, lubricants, colorants, flowability controllers, nucleation agents, antifungal agents, etc. at any stage within the scope which does not impair the effect of the present invention.

The resin composition of the present invention is kneaded so that the inorganic filler component (C) may exist selectively in the polymeric component (A) forming the dispersed phases.

The resin composition of the present invention can be prepared by use of kneading machines in general to be used for kneading of conventional thermoplastic resins and elastomers as described below.

More specifically, powdery or granular respective components are dispersed uniformly into a mixture by means of Henschel mixer, super mixer, ribbon blender, V-blender, and subsequently the mixture is melted and kneaded by use of a twin screw extruder, a single screw extruder, rolls, Banbury mixer, Plastomill, Brabender plastograph, etc. The melting and kneading temperature may be generally within the range of 200° C. to 350° C.

At this time, it is preferred that 90 % or more in number of the inorganic filler component (C) should exist in the dispersed phases formed by the polymer component, more preferably 95 % or more.

For making such a structure, in addition to selection of the inorganic filler, selections of kneading method and kneading conditions are necessary, and there may be employed the method in which previously the inorganic filler and the polyphenylene ether resin optionally together with the alkenylaromatic compound-conjugated diene copolymer and the compound having unsaturated group and polar group in the same molecule are kneaded, and then kneaded with the polyamide resin, or in which all of these components are kneaded at the same time.

The L/D of the extruder employed when the respective components other than the polyamide are kneaded previously may be 25 or less, preferably 20 or less. On the other hand, the extruder to be used for kneading of polyamide may have a L/D or 25 or more, preferably 30 or more.

The resin composition thus obtained can be extruded after melting and kneading into pellets.

The molding processing method in which the resin composition of the present invention is used is not particularly limited, but it can be easily molded according to molding methods applicable to thermoplastic resins in general, such as extrusion molding, hollow molding, injection molding, sheet molding, heat molding, rotatory molding, lamination molding, etc., but it is most suitable for injection molding among them.

The resin composition of the present invention has, as the resin components, a polyamide resin and an alkenylaromatic compound-conjugated diene copolymer formulated in a polyphenylene ether resin, an inorganic filler existing in the dispersed phases formed by these polymer components, and further a compound having unsaturated group and polar group in combination in the same molecule formulated therein, and therefore is excellent in balance of physical properties of rigidity and impact strength, and also exhibits good moldability and organic solvent resistance, as compared with the resin composition comprising a polyphenylene ether resin blended with a polyamide resin which has been known in the prior art.

Also, the molded product having good mechanical properties and dimensional stability, is suitable for inner and outer decorative parts of automobiles as well as for uses in parts of the so-called office automation instruments.

EXAMPLES

The present invention is described by referring to Examples, but the present invention is not limited in its scope by the Examples at all.

In Examples and Comparative examples shown below, the respective physical property values and various properties were evaluated under the conditions shown below.

(1) Flexural modulus:

Measured according to ISO R178-1974 Procedure 12 (JIS K7203), by use of Instron tester.

(2) Izod impact strength:

Measured according to ISO R180-1969 (JIS K710) notched Izod impact strength, by use of Izod impact tester manufactured by Toyo Seiki Seisakusho.

(3) Falling dart impact strength:

By permitting a dart (2×7 kgf) which is the load sensor to fall onto a test strip (120×80×2 mm) placed on a supporting stand (hole form 40 mm), the deformation destruction behavior under the impact load of the test strip was measured, and the impact energy absorbed up to the crack generation point in the impact pattern was calculated and defined as the impact strength of the material.

(4) Organic solvent resistance:

Measured according to the ¼ ellipsoidal method Bergen {SPE Journal 667 (1962)}. Specifically, a test strip of 2 mm plate thickness was fixed onto one fourth ellipsoidal implement with a longer axis of 24 cm and a shorter axis of 8 cm, dipped into a commercially available gasoline for 5 minutes and the minimum strain at which crack is generated is determined as the limiting strain.

In this case, one with no crack generation is judged as (extremely good), one with limiting strain value of 1.5 % or higher as (good), one with 1.0 to 1.5 % as (common), and one with less than 1.0 % as x (bad).

EXAMPLE 1

(1) Preparation of resin composition:

As the polyphenylene ether resin ((1) of the component (A)), 48 parts by weight of a poly(2,6-dimethyl-1,4-pheny-lene)ether having an inherent viscosity of 0.52 dl/g (30 °C. in chloroform), as the polyamide resin ((2) of the component (A)), 48 parts by weight of a nylon-6 (trade name: Ultramid, injection molding grade) manufactured by Badische Aniline und Soda Aktiengesellschaft (West Germany), as the alkenylaromatic compound-conjugated copolymer ((3) of the component (A)), 4 parts by weight of a commercially available styrene-butadiene block copolymer (manufactured by Shell Chemical Co., trade name: KX 65, styrene content: 28 % by weight), as the compound having unsaturated group and polar group in the same molecule (the component (B)), 0.5 part by weight of a commercially available maleic anhydride (reagent grade), and as the inorganic filler (the component (C)), 6 parts of titanium oxide with an average particle size of 0.20 $\mu$m were employed, and the respective components were thoroughly stirred and mixed by a super mixer, and then melted and kneaded by means of a PCM twin screw mixer manufactures by Ikegai Tekko K.K. at a setting temperature of 280° C. to be formed into a composition, which was then extruded into a strand and formed into pellets by a cutter.

(2) Preparation of test strip and evaluation test:

By means of an inline screw type injection molding machine, Model IS-90B manufactured by Toshiba Kikai Seisakusho, injection molding was performed at a cylinder temperature of 280° C. and a mold cooling temperature of 60 ° C. to prepare a test strip. Immediately before carrying out injection molding, the pellets were dried by use of a vacuum drier under the conditions of 0.1 mmHg, 80° C. for 48 hours. The injection molded test strip was placed in a dessicator immediately after injection molding, left to stand at 23° C. for 4 days to 6 days and then provided for the respective evaluation tests. The results are shown in the Table.

Also, a thin piece was cut out from a test piece and an enlarged photograph (×5000) was photographed by using a transmissive type electron microscope. The result is shown in FIG. 1. It can be understood that polyphenylene particles are dispersed in a polyamide resin matrix and an inorganic filler is dispersed in the polyphenylene particles.

EXAMPLES 2

A resin composition was prepared in the same manner as in Example 1 except for using 6 parts by weight of barium sulfate with an average particle size of 0.10 $\mu$m in place of titanium oxide as the inorganic filler (the component (C)), from which test strips for evaluation were prepared, and the respective evaluation tests were conducted. The results are shown in the Table.

EXAMPLE 3

A resin composition was prepared in the same manner as in Example 1 except for using 6 parts by weight of zinc oxide with an average particle size of 0.27 $\mu$m in place of titanium oxide as the inorganic filler (the component (C)), from which test strips were prepared, and the respective evaluation tests were conducted. The results are shown in the Table.

EXAMPLE 4

A resin composition was prepared in the same manner as in Example 1 except for using 6 parts by weight of silicon oxide ($SiO_2$) with an average particle size of 0.30 $\mu$m in place of titanium oxide as the inorganic filler (the component (C)), from which test strips were prepared, and the respective evaluation tests were conducted. The results are shown in the Table.

COMPARATIVE EXAMPLE 1

A resin composition was prepared in the same manner as in Example 1 except for formulating nothing as added as shown in the Table, from which test strips for evaluation were prepared and the respective evaluation tests were conducted. The results are shown in the Table.

TABLE

|  |  | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Composite material (weight ratio) | | | | | | | | | | | |
| Polyphenylene ether resin: Component (A)-(1) | | 48 | 48 | 48 | 48 | 48 | 48 | 48 | 48 | 16 | 80 |
| Polyamide resin (nylon 6): Component (A)-(2) | | 48 | 48 | 48 | 48 | 48 | 48 | 48 | 48 | 80 | 16 |
| Alkenylaromatic compound-conjugated diene copolymer (KX 65): Component (A)-(3) | | 4 | 4 | 4 | 4 | 4 | 4 | 4 | 4 | 4 | 4 |
| Compound having unsaturated group and polar group (maleic anhydride) Component (B) | | 0.5 | 0.5 | 0.5 | 0.5 | 0.5 | 0.5 | 0.5 | 0.5 | 0.5 | 0.5 |
| Inorganic filler: Component (C) | Kinds | $TiO_2$ | $Ba_2SO_4$ | ZnO | $SiO_2$ | — | Talc | Wallastonite | $SiO_2$ | $TiO_2$ | $TiO_2$ |
|  | Average size (μm) | 0.20 | 0.10 | 0.27 | 0.30 | — | 5.0 | 3.0 | 1.2 | 0.20 | 0.20 |
|  | amount | 6 | 6 | 6 | 6 | — | 6 | 6 | 6 | 6 | 6 |
| Evaluation tests | | | | | | | | | | | |
| Flexural modulus (23° C.) (kg/cm$^2$) | | 25,000 | 25,100 | 25,000 | 25,200 | 23,000 | 25,000 | 25,200 | 25,100 | 25,700 | 24,900 |
| Izod impact strength (23° C.) (kg cm/cm) | | 10.0 | 9.0 | 8.0 | 8.9 | 5.3 | 2.0 | 3.0 | 5.1 | 4.9 | 2.5 |
| Falling dart impact strength (23° C.) (kg cm) | | 200 | 192 | 180 | 195 | 151 | 30 | 120 | 138 | 150 | 90 |
| Organic solvent resistance | | O | O | O | O | O | O | O | O | O | X | the inorganic filler (the component (C)), from which test strips for evaluation were prepared, and the respective evaluation tests were conducted. The results are shown in the Table.

COMPARATIVE EXAMPLE 2

A resin composition was prepared in the same manner as in Example 1 except for using 6 parts by weight of talc with an average particle size of 5.0 μm in place of titanium oxide as the inorganic filler (the component (C)), from which test strips for evaluation were prepared, and the respective evaluation tests were conducted. The results are shown in the Table.

COMPARATIVE EXAMPLE 3

A resin composition was prepared in the same manner as in Example 1 except for using 6 parts by weight of wallastonite with an average particle size of 3.0 μm and an aspect ratio of about 10 in place of titanium oxide as the inorganic filler (the component (C)), from which test strips for evaluation were prepared, and the respective evaluation tests were conducted. The results are shown in the Table.

COMPARATIVE EXAMPLE 4

A resin composition was prepared in the same manner as in Example 1 except for using 6 parts by weight of silicon oxide ($SiO_2$) with an average particle size of 1.2 μm in place of titanium oxide as the inorganic filler (the component (C)), from which test strips for evaluation were prepared, and the respective evaluation tests were conducted. The results are shown in the Table.

COMPARATIVE EXAMPLES 5 and 6

A resin composition was prepared in the same manner as in Example 1 except for changing amounts of polyphenylene ether resin and polyamide resin to be added as shown in the Table, from which test strips for evaluation were prepared and the respective evaluation tests were conducted. The results are shown in the Table.

We claim:

1. A resin composition comprising:
   (A) 100 parts by weight of a resin comprising
      (1) 20 to 60 % by weight of a polyphenylene ether resin,
      (2) 25 to 65 % by weight of a polyamide resin, and
      (3) 1 to 35 % by weight of an alkenylaromatic compound-conjugated diene copolymer;
   (B) 0.01 to 10 parts by weight of a compound having unsaturated group and polar group in combination within the same molecule; and
   (C) 1 to 50 parts by weight of an inorganic filler having an average particle size of 1 μm or less, said polyphenylene ether resin being dispersed into the polyamide resin which forms continuous phase, and said inorganic filler being dispersed into dispersed phases of the polyphenylene ether resin.

2. A resin composition according to claim 1, comprising:
   (A) 100 parts by weight of a resin comprising:
      (1) 23 to 55 % by weight of a polyphenylene ether resin,
      (2) 30 to 60 % by weight of a polyamide resin, and
      (3) 1 to 25 % by weight of an alkenylaromatic compound-conjugated diene copolymer;
   (B) 0.05 to 5 parts by weight of a compound having unsaturated group and polar group in combination within the same molecule; and
   (C) 1 to 35 parts by weight of the inorganic filler.

3. A resin composition according to claim 1, comprising:
   (A) 100 parts by weight of a resin comprising:
      (1) 25 to 52 % by weight of a polyphenylene ether resin,
      (2) 35 to 58 % by weight of a polyamide resin, and (3) 2 to 20 % by weight of an alkenylaromatic compound-conjugated diene copolymer;

(B) 0.1 to 2 parts by weight of a compound having unsaturated group and polar group in combination within the same molecule; and (C) 2 to 20 parts by weight of the inorganic filler having an average particle size of 1 μm or less.

4. A resin composition according to claim 1, wherein the polyphenylene ether resin has an inherent viscosity of 0.35 to 0.70 dl/g (measured at 30° C. in chloroform) and the polyamide resin has a relative viscosity of 2.0 to 8.0 (measured at 25° C. in 98% conc. sulfuric acid).

5. A resin composition according to claim 1, wherein the alkenylaromatic compound-conjugated diene copolymer is a block copolymer represented by the following formula or a hydrogenated product thereof:

(wherein A represents a polymer block of the alkenylaromatic compound, B represents an elastomeric block copolymer of conjugated dienes, m represents 0 or a positive integer, and n represents 0 or 1).

6. A resin composition according to claim 5, wherein the content of the alkenylaromatic compound units in the alkenylaromatic compound-conjugated diene copolymer is 20 to 70 % by weight.

7. A resin composition according to claim 5, wherein the alkenyl aromatic compound-conjugated diene copolymer has a Brookfield's viscosity value (measured at 25° C. in 25 % by weight of solution in toluene) of 200 to 40,000 cps.

8. A resin composition according to claim 1, wherein the compound having unsaturated group and polar group in the same molecule is a compound having a carbon-carbon double bond or a carbon-carbon triple bond and a carboxyl group, a salt or ester thereof, an acid amide, an acid anhydride, an imide, an acid azide, an acid halide, oxazoline, nitrile, epoxy group, amino group, hydroxyl group or isocyanic ester.

9. A resin composition according to claim 8, wherein the compound having unsaturated group and polar group in the same molecule is at least one selected from the group consisting of maleic anhydride, maleic acid, itaconic anhydride, itaconic acid, unsaturated alcohols and epoxidized natural oils and fats.

10. A resin composition according to claim 1, wherein the inorganic filler is at least one selected from single substances, oxides, hydroxides, carbonates, sulfates, silicates, sulfites of metal atoms of the group I to the group VIII of the periodic table.

11. A resin composition according to claim 10, wherein the inorganic filler is at least one selected from the group consisting of titanium oxide, zinc oxide, barium sulfate, silica, calcium carbonate, iron oxide, alumina, calcium titanate, aluminum hydroxide, magnesium hydroxide, calcium hydroxide, magnesium carbonate, calcium sulfate, sodium sulfate, calcium sulfite and calcium silicate.

* * * * *